US011114921B2

(12) United States Patent
Ito et al.

(10) Patent No.: US 11,114,921 B2
(45) Date of Patent: Sep. 7, 2021

(54) VEHICLE DRIVE DEVICE FOR LUBRICATION A POWER TRANSMISSION AND COOLING A ROTATING ELECTRIC MACHINE

(71) Applicants: TOYOTA JIDOSHA KABUSHIKI KAISHA, Toyota (JP); AISIN AW CO., LTD., Anjo (JP)

(72) Inventors: Eiji Ito, Nisshin (JP); Kiyonori Takagi, Okazaki (JP); Naoya Jinnai, Anjo (JP); Takahiro Kato, Anjo (JP)

(73) Assignees: TOYOTA JIDOSHA KABUSHIKI KAISHA, Toyota (JP); AISIN CORPORATION, Anjo (JP)

( * ) Notice: Subject to any disclaimer, the term of this patent is extended or adjusted under 35 U.S.C. 154(b) by 94 days.

(21) Appl. No.: 16/256,643

(22) Filed: Jan. 24, 2019

(65) Prior Publication Data

US 2019/0229582 A1 Jul. 25, 2019

(30) Foreign Application Priority Data

Jan. 24, 2018 (JP) .............................. JP2018-010021

(51) Int. Cl.
*H02K 9/19* (2006.01)
*B60K 11/02* (2006.01)
(Continued)

(52) U.S. Cl.
CPC ................. *H02K 9/19* (2013.01); *B60K 1/00* (2013.01); *B60K 7/0007* (2013.01); *B60K 11/02* (2013.01);
(Continued)

(58) Field of Classification Search
CPC .......... H02K 9/19; H02K 9/193; H02K 9/197; B60K 1/00; B60K 7/0007; B60K 11/02;
(Continued)

(56) References Cited

U.S. PATENT DOCUMENTS 5,372,213 A * 12/1994 Hasebe ................ B60K 17/046
180/65.6
2011/0298314 A1* 12/2011 Atarashi ................ B60K 6/405
310/54

(Continued)

FOREIGN PATENT DOCUMENTS

DE 42 36 124 A1 5/1993
DE 10 2016 122 948 A1 6/2017
(Continued)

*Primary Examiner* — Michael Andrews
(74) *Attorney, Agent, or Firm* — Oliff PLC

(57) ABSTRACT

A vehicle drive device is provided with a lubricating path including a first oil pump to pump up an oil stored in the casing by the first oil pump and to supply the oil to the power transmission mechanism for lubricating the power transmission mechanism, and a cooling path that is separated from the lubricating circuit and provided for the rotating electric machine, the cooling path including a second oil pump to pump up the oil stored in the casing by the second oil pump to supply the oil exclusively to the rotating electric machine for cooling the rotating electric machine, the second oil pump is an electric oil pump, and the cooling path is provided with an oil cooler cooling the oil to be supplied to the rotating electric machine.

5 Claims, 4 Drawing Sheets

(51) Int. Cl.
*B60K 7/00* (2006.01)
*F01M 1/02* (2006.01)
*F16H 57/04* (2010.01)
*F01M 1/12* (2006.01)
*B60K 1/00* (2006.01)
*F16H 57/02* (2012.01)

(52) U.S. Cl.
CPC ............... *F01M 1/02* (2013.01); *F01M 1/12* (2013.01); *F16H 57/043* (2013.01); *F16H 57/045* (2013.01); *F16H 57/0424* (2013.01); *F16H 57/0426* (2013.01); *F16H 57/0436* (2013.01); *F16H 57/0441* (2013.01); *F16H 57/0457* (2013.01); *F16H 57/0471* (2013.01); *F16H 57/0476* (2013.01); *F16H 57/0495* (2013.01); *B60K 2001/001* (2013.01); *B60K 2001/006* (2013.01); *B60Y 2306/03* (2013.01); *F01M 2001/123* (2013.01); *F16H 2057/0206* (2013.01); *F16N 2210/18* (2013.01); *F16N 2270/56* (2013.01)

(58) Field of Classification Search
CPC ........ B60K 2001/001; B60K 2001/006; B60Y 2306/03; F01M 1/02; F16H 57/0436; F16H 57/0441; F16H 57/045; F16H 57/0476

USPC .......................................................... 310/54
See application file for complete search history.

(56) References Cited

U.S. PATENT DOCUMENTS

| | | | |
|---|---|---|---|
| 2012/0211322 A1* | 8/2012 | Kasuya | ................. F16D 25/123 192/70.12 |
| 2013/0145879 A1 | 6/2013 | Nakamura et al. | |
| 2014/0174856 A1 | 6/2014 | Takagi et al. | |
| 2017/0167596 A1 | 6/2017 | Nishimine | |
| 2017/0175612 A1 | 6/2017 | Tokozakura et al. | |
| 2017/0219085 A1 | 8/2017 | Kiyokami et al. | |
| 2018/0241288 A1 | 8/2018 | Murakami et al. | |

FOREIGN PATENT DOCUMENTS

| | | |
|---|---|---|
| JP | H05-169985 A | 7/1993 |
| JP | H06-098417 A | 4/1994 |
| JP | 2013-119918 A | 6/2013 |
| JP | 2017-114477 A | 6/2017 |
| JP | 2017-136964 A | 8/2017 |
| JP | 2017-137991 A | 8/2017 |
| JP | 2018-57243 A | 4/2018 |
| WO | 2013/011562 A1 | 1/2013 |
| WO | 2017/072874 A1 | 5/2017 |
| WO | 2018/061443 A1 | 4/2018 |

* cited by examiner

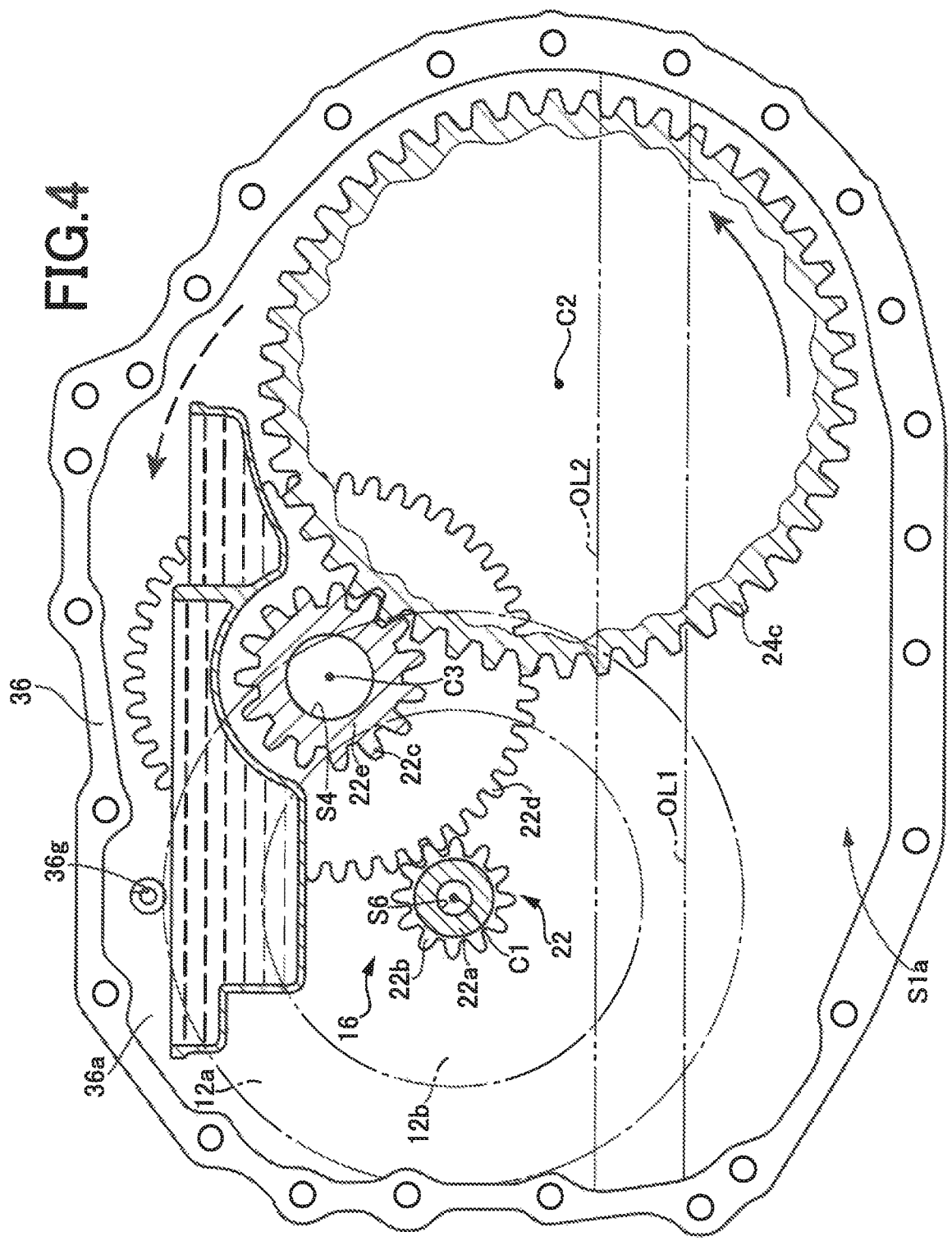

VEHICLE DRIVE DEVICE FOR LUBRICATION A POWER TRANSMISSION AND COOLING A ROTATING ELECTRIC MACHINE

The disclosure of Japanese Patent Application No. 2018-010021 filed on Jan. 24, 2018 including the specification, drawings and abstract is incorporated herein by reference in its entirety.

BACKGROUND OF THE INVENTION

Field of the Invention

The present invention relates to a technique in a vehicle drive device supplying an oil stored in a casing housing a rotating electric machine and a power transmission mechanism to the power transmission mechanism and the rotating electric machine to lubricate the power transmission mechanism and to cool the rotating electric machine, for sufficiently ensuring a cooling performance for cooling the rotating electric machine while a power loss due to lubrication of the power transmission mechanism and cooling of the rotating electric machine during running of a vehicle is reduced.

Description of the Related Art

There is known a vehicle drive device that includes (a) a rotating electric machine, (b) a power transmission mechanism transmitting a rotational drive power between the rotating electric machine and multiple wheels, and (c) a casing housing the rotating electric machine and the power transmission mechanism and (d) that supplies an oil stored in the casing to the power transmission mechanism and the rotating electric machine to lubricate the power transmission mechanism and to cool the rotating electric machine. For example, this corresponds to a vehicle drive device described in Patent Document 1. In Patent Document 1, the oil stored in the casing is pumped up by a mechanical oil pump, and the pumped-up oil is supplied to the power transmission mechanism and the rotating electric machine.

CITATION LIST

Patent Document 1: Japanese Laid-Open Patent Publication No. 2013-119918

SUMMARY OF THE INVENTION

Technical Problem

In the vehicle drive device as described in Patent Document 1, the oil pumped up by the mechanical oil pump is used for lubrication of the power transmission mechanism and cooling of the rotating electric machine through one path, and therefore, for example, a portion of the oil pumped up by the mechanical oil pump for lubricating the power transmission mechanism is consumed in the cooling of the rotating electric machine, so that a cooling performance for cooling the rotating electric machine deteriorates. Therefore, to sufficiently ensure the cooling performance for cooling the rotating electric machine, i.e., to increase a flow rate of the oil supplied to the rotating electric machine, the mechanical oil pump must be increased in size, causing a problem of an increased power loss due to driving of the oil pump. Additionally, when the temperature of the oil rises, it is required to further increase the flow rate of the oil supplied to the rotating electric machine for cooling the rotating electric machine.

The present invention was conceived in view of the situations and it is therefore an object of the present invention to provide a vehicle drive device which sufficiently ensures a cooling performance for cooling a rotating electric machine and reduces a power loss due to lubrication of a power transmission mechanism and cooling of the rotating electric machine during running.

Solution to Problem

To achieve the above object, a first aspect of the present invention provides a vehicle drive device comprising: (a) a rotating electric machine; a power transmission mechanism transmitting a rotational drive power between the rotating electric machine and multiple wheels; and a casing housing the rotating electric machine and the power transmission mechanism, the vehicle drive device supplying an oil stored in the casing to the power transmission mechanism and the rotating electric machine to lubricate the power transmission mechanism and to cool the rotating electric machine, wherein the vehicle drive device is provided with (b) a lubricating path including a first oil pump to pump up an oil stored in the casing by the first oil pump and to supply the oil to the power transmission mechanism for lubricating the power transmission mechanism, and (c) a cooling path that is separated from the lubricating path and provided for the rotating electric machine, the cooling path including a second oil pump to pump up the oil stored in the casing by the second oil pump to supply the oil exclusively to the rotating electric machine for cooling the rotating electric machine, wherein (d) the second oil pump is an electric oil pump, and wherein (e) the cooling path is provided with an oil cooler cooling the oil to be supplied to the rotating electric machine.

Advantageous Effects of Invention

The vehicle drive device according to the first aspect of the invention is provided with the lubricating path including the first oil pump to pump up the oil stored in the casing by the first oil pump and to supply the oil to the power transmission mechanism for lubricating the power transmission mechanism and the cooling path that is separated from the lubricating path and provided for the rotating electric machine, the cooling path including the second oil pump to pump up the oil stored in the casing by the second oil pump to supply the oil exclusively to the rotating electric machine for cooling the rotating electric machine, the second oil pump is an electric oil pump, and the cooling path is provided with the oil cooler cooling the oil to be supplied to the rotating electric machine. Therefore, the vehicle drive device has the cooling path provided for the rotating electric machine for cooling the rotating electric machine and the lubricating path for lubricating the power transmission mechanism disposed as separate paths, and therefore, only when the rotating electric machine needs to be cooled, the electric oil pump i.e. the second oil pump can be driven so that only the rotating electric machine can sufficiently be cooled by the cooling path provided for the rotating electric machine. Additionally, the first oil pump does not need to cool the rotating electric machine due to the provision of the cooling path and can therefore suitably be reduced in size as compared to a conventional oil pump lubricating the power transmission mechanism while cooling the rotating electric machine, for example. Furthermore, since the cooling path is provided with the oil cooler cooling the oil supplied to the rotating electric machine, a flow rate of the oil discharged from the second oil pump for cooling the rotating electric machine can be prevented from increasing, and the second oil pump can suitably be reduced in size. This makes it possible to sufficiently ensure a cooling performance for cooling the rotating electric machine and to reduce a power loss due to lubrication of the power transmission mechanism and cooling of the rotating electric machine during running.

BRIEF DESCRIPTION OF DRAWINGS

FIG. 4 is a cross-sectional view of a catch tank disposed in the lubricating path of FIG. 2.

DESCRIPTION OF EMBODIMENTS

Figure 1:
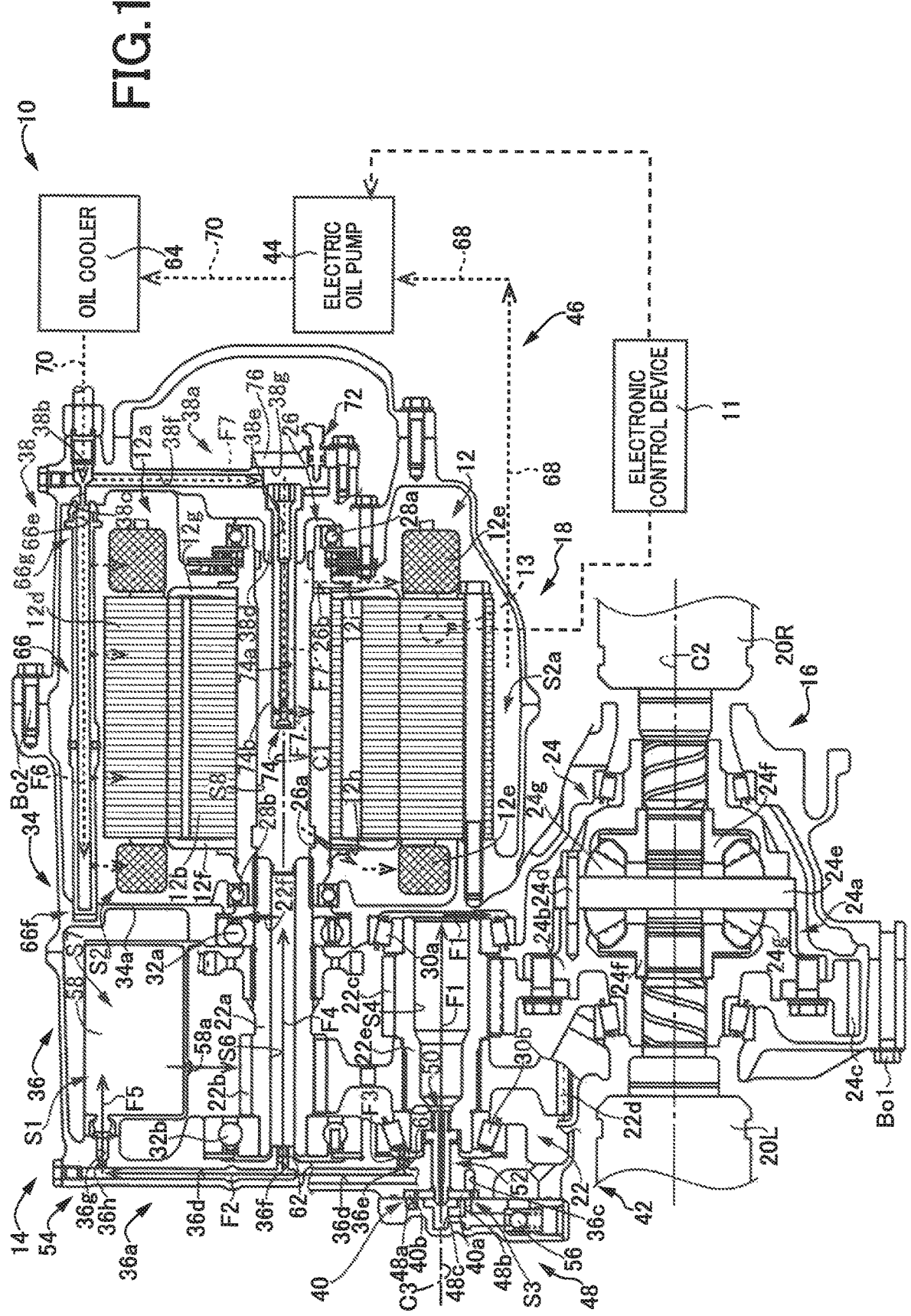
FIG. 1 is a cross-sectional view for schematically explaining a configuration of a drive device of an electric vehicle to which the present invention is suitably applied.

A second aspect of the present invention provides the vehicle drive device recited in the first aspect of the invention, wherein the second oil pump is driven when a temperature of a stator of the rotating electrical machine is higher than a predetermined temperature. Therefore, the electric oil pump i.e. the second oil pump can be driven only when the temperature of the stator is higher than the predetermined temperature so that the rotating electric machine needs to be cooled.

A third aspect of the present invention provides the vehicle drive device recited in the first or second aspect of the invention, wherein the lubricating path is provided with a catch tank storing at least a portion of the oil discharged from the first oil pump and ejecting the stored oil to the power transmission mechanism. Therefore, since at least a portion of the oil discharged from the first oil pump is stored in the catch tank, a level of the oil stored in the casing has a suitably lowered height, which suitably reduces an agitation loss when the gear disposed in the power transmission mechanism agitates the oil stored in the casing.

A fourth aspect of the present invention provides the vehicle drive device recited in any one of the first to third aspects of the invention, wherein the cooling path is provided with a cooling pipe into which at least a portion of the oil discharged from the second oil pump is introduced and which discharges the introduced oil to the rotating electric machine. Therefore, the oil stored in the casing is pumped up by the second oil pump, and the pumped-up oil is discharged from the cooling pipe to the rotating electric machine, so that the rotating electric machine is suitably cooled with the oil.

A fifth aspect of the present invention provides the vehicle drive device recited in any one of the first to fourth aspects of the invention, wherein (a) a rotor disposed in the rotating electric machine is rotatably supported by a cylindrical rotor shaft penetrating through and integrally fixed to the rotor such that at least a portion of the oil discharged from the second oil pump is introduced into the inside of the rotor shaft, and wherein (b) the cooling path includes a radial oil passage formed in the rotor shaft to eject the oil introduced into the inside of the rotor shaft to the rotating electric machine. Therefore, the oil stored in the casing is pumped up by the second oil pump, and the oil introduced into the rotor shaft is ejected due to a centrifugal force from the radial oil passage formed in the rotor shaft to the rotating electric machine, so that the rotating electric machine is suitably cooled with the oil.

A sixth aspect of the present invention provides the vehicle drive device recited in the fourth aspect of the invention, wherein (a) a rotor disposed in the rotating electric machine is rotatably supported by a cylindrical rotor shaft penetrating through and integrally fixed to the rotor such that at least a portion of the oil discharged from the second oil pump is introduced into the inside of the rotor shaft, and wherein (b) the cooling path includes a supply oil passage for supplying the oil discharged from the second oil pump to an oil introduction port of the cooling pipe, a branch oil passage branched from the supply oil passage to introduce a portion of the oil supplied to the supply oil passage to the inside of the rotor shaft, and a radial oil passage formed in the rotor shaft to eject the oil introduced into the inside of the rotor shaft to the rotating electric machine. Therefore, a portion of the oil supplied to the supply oil passage is introduced into the rotor shaft through the branch oil passage, and the portion of the oil is ejected due to a centrifugal force to the rotating electric machine from the radial oil passage formed in the rotor shaft, while another portion of the oil supplied to the oil supplied to the supply oil passage is discharged from the cooling pipe to the rotating electric machine, so that the rotating electric machine is suitably cooled with the oil.

A seventh aspect of the present invention provides the vehicle drive device recited in the sixth aspect of the invention, wherein an orifice is provided between the supply oil passage and the oil introduction port of the cooling pipe such that a cross-sectional area in flow-passage is smaller than in the supply oil passage. Therefore, the oil supplied through the orifice to the supply oil passage is prevented from being excessively supplied to the cooling pipe, so that the oil introduced into the rotor shaft is suitably prevented from becoming insufficient in flow rate.

An example of the present invention will be described in detail with reference to the drawings. In the following example, the figures are simplified or deformed as appropriate and portions are not necessarily precisely drawn in terms of dimension ratio, shape, etc.

First Example

FIG. 1 is a cross-sectional view for schematically explaining a configuration of an electric vehicle 10 to which the present invention is suitably applied. The electric vehicle 10 includes a drive device (vehicle drive device) 14 driving a pair of right and left drive wheels (wheels) not shown by an electric motor (rotating electric machine) 12 that is a drive power source for running. As shown in FIG. 1, the drive device 14 includes an electric motor 12, a power transmission mechanism 16 transmitting a rotational drive power from the electric motor 12 to the pair of right and left drive wheels or transmitting a rotational drive power from the pair of right and left drive wheels to the electric motor 12, i.e., transmitting a rotational drive power between the electric motor 12 and the pair of right and left drive wheels, a housing (casing) 18 housing the electric motor 12, the power transmission mechanism 16 etc., and drive shafts 20L, 20R rotating together with the pair of right and left drive wheels. The power transmission mechanism 16 includes a gear mechanism 22 coupled to the electric motor 12 in a power transmittable manner and a differential device 24 coupled to the gear mechanism 22 in a power transmittable manner.

As shown in FIG. 1, the electric motor 12 includes, for example, a cylindrical stator 12a fixed to the housing 18 and a cylindrical rotor 12b fixed to a rotor shaft 26, such that the outer surface of the rotor 12b is apart from the inner surface of the cylindrical stator 12a by a predetermined gap. The cylindrical rotor shaft 26 penetrating through and integrally fixed to the cylindrical rotor 12b is rotatably supported around a first rotation axis C1 by the housing 18 via a pair of first bearings 28a, 28b, and the rotor 12b is rotatably supported around the first rotation axis C1 by the rotor shaft 26. The stator 12a includes a cylindrical stator core 12d having multiple magnetic steel plates 12c (see FIG. 3) laminated in a first rotation axis C1 direction and coil ends 12e wound around the stator core 12d on both sides of the stator core 12d in the direction of the first rotation axis C1.

As shown in FIG. 1, the differential device 24 includes a container-shaped differential casing 24a rotatably supported around a second rotation axis C2, a differential ring gear 24c fixed to an outer circumferential portion 24b of the differential casing 24a, a columnar pinion shaft 24e having both end portions supported by the differential casing 24a and fixed to the differential casing 24a by a knock pin 24d in a posture orthogonal to the second rotation axis C2, a pair of side gears 24f rotatably arranged around the second rotation axis C2 in a facing state across the pinion shaft 24e and housed in the differential casing 24a, and a pair of pinions 24g meshing with the pair of the side gears 24f and rotating together with the differential casing 24a while the pinion shaft 24e is inserted through the pair of pinions 24g such that the pair of pinions 24g are rotatably supported by the pinion shaft 24e. The pair of drive shafts 20L, 20R are respectively coupled to the pair of the side gears 24f.

Figure 2:
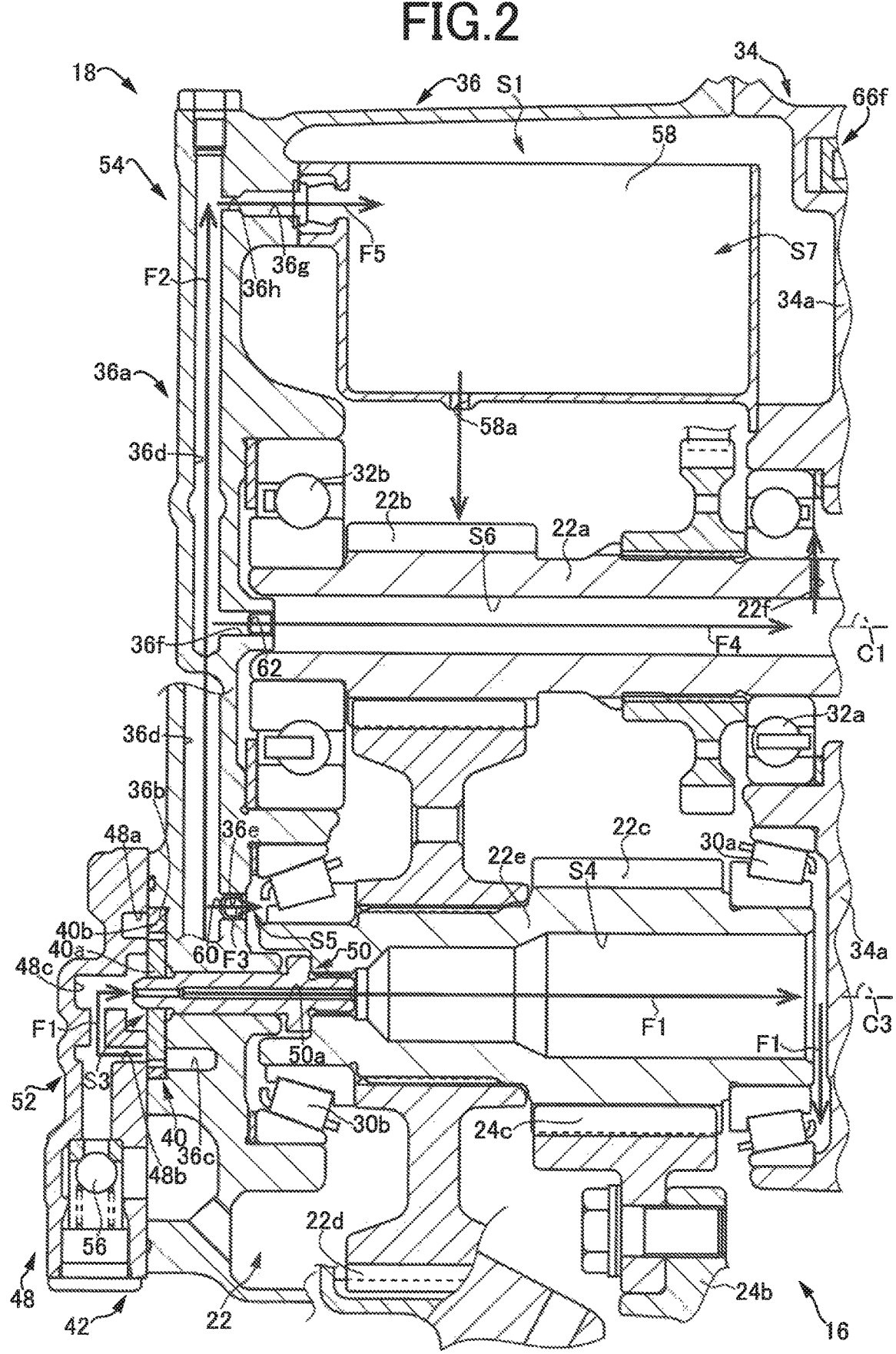
FIG. 2 is an enlarged view of FIG. 1 showing details of a lubricating path provided in the drive device of FIG. 1.

As shown in FIGS. 1 and 2, the gear mechanism 22 includes a cylindrical first rotating shaft 22a coupled to the rotor shaft 26, which is disposed in the electric motor 12, in a power transmittable manner a pinion 22b formed integrally with the first rotating shaft 22a, a small diameter gear 22c meshed with the differential ring gear 24c disposed in the differential device 24, a large diameter gear 22d having a diameter larger than the small diameter gear 22c and meshed with the pinion 22b formed on the first rotating shaft 22a, and a cylindrical second rotating shaft 22e to which the small diameter gear 22c and the large diameter gear 22d are integrally fixed. In the gear mechanism 22, the second rotating shaft 22e is rotatably supported around a third rotation axis C3 by the housing 18 via a pair of second bearings 30a, 30b respectively disposed at both end portions of the second rotating shaft 22e. The first rotating shaft 22a is rotatably supported around the first rotation axis C1 by the housing 18 via a pair of third bearings 32a, 32b respectively disposed at both end portions of the first rotating shaft 22a, i.e., rotatably supported around the same rotation axis C1 as the rotor shaft 26 disposed in the electric motor 12.

Figure 3:
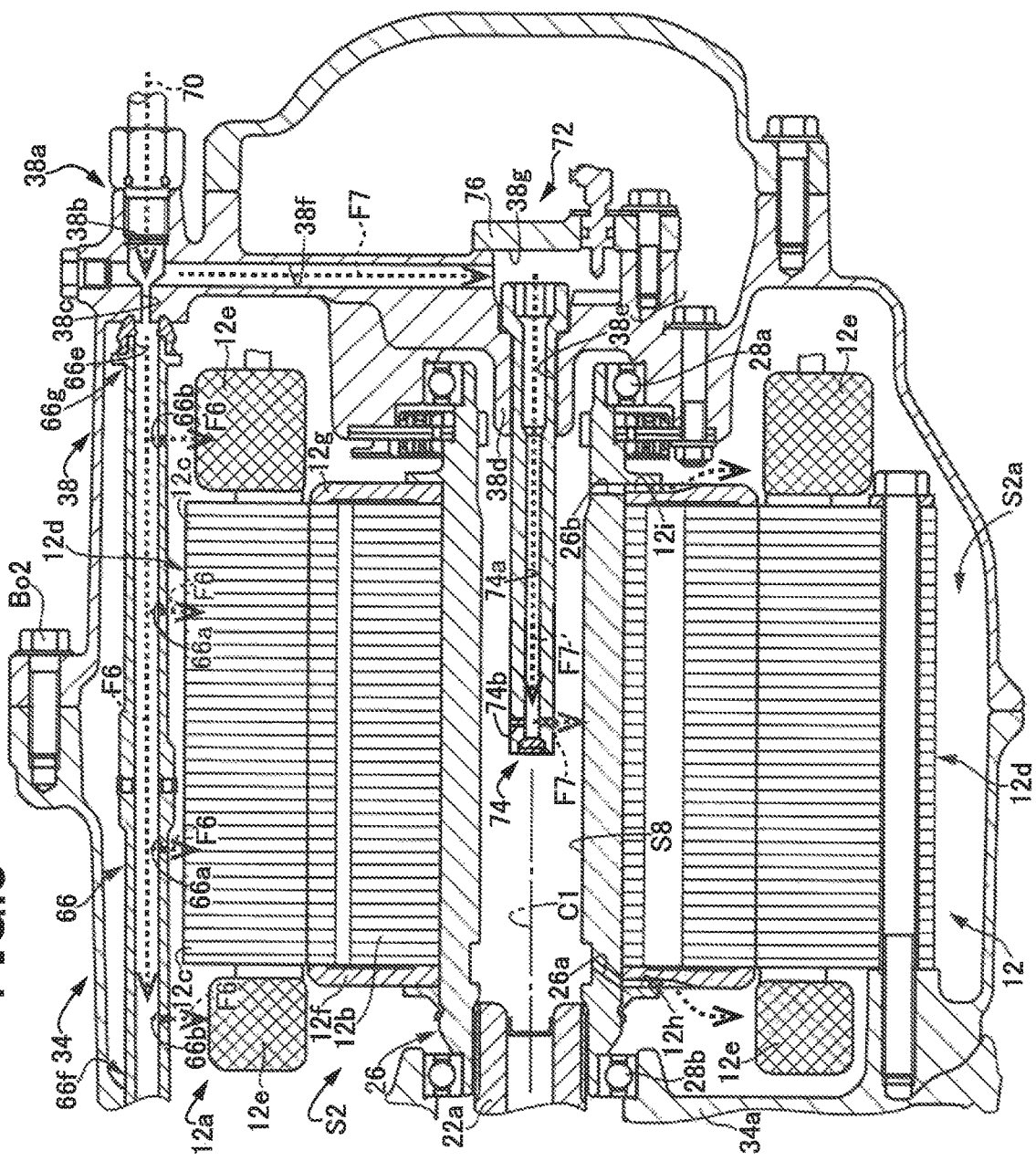
FIG. 3 is an enlarged view of FIG. 1 showing details of a cooling path disposed in the drive device of FIG. 1.

As shown in FIGS. 1 to 3, the housing 18 includes a first casing member 34, a second casing member 36 integrally fixed to the first casing member 34 by a first fastening bolt Bo1 (see FIG. 1), and a third casing member 38 integrally fixed to the first casing member 34 by a second fastening bolt Bo2 (see FIGS. 1 and 3). The housing 18 is provided to have a first housing space S1 formed by the first casing member 34 and the second casing member 36, and a second housing space S2 formed by the first casing member 34 and the third casing member 38, and the first housing space S1 houses the power transmission mechanism 16 etc., i.e., the gear mechanism 22, the differential device 24, etc., and second housing space S2 houses the electric motor 12 etc. The first casing member 34 is provided with a partition wall 34a separating the first housing space S1 and the second housing space S2, the second casing member 36 is provided with a wall portion 36a facing the partition wall 34a formed in the first casing member 34, and the third casing member 38 is provided with a wall portion 38a facing the partition wall 34a formed in the first casing member 34.

As shown in FIGS. 1 to 3, the drive device 14 is provided with a lubricating path 42 including a mechanical oil pump 40 driven by running of the vehicle 10, i.e., by rotational drive of the second rotating shaft 22e of the gear mechanism 22, and the pump 40 pumps up an oil stored in the housing 18 and supplies the oil to the power transmission mechanism 16 etc. for lubricating the power transmission mechanism 16 etc., and a cooling path 46 that is separated from the lubricating path 42 and provided for the electric motor 12, the cooling path 46 including an electric oil pump 44 driven by an electronic control device 11 to pump up the oil stored in the housing 18 by the electric oil pump 44 to supply the oil exclusively to the electric motor 12 for cooling the electric motor 12.

The mechanical oil pump 40 is an internal gear type oil pump and corresponds to a first oil pump of the present invention. As shown in FIG. 2, the mechanical oil pump 40 includes a pump chamber S3 formed by the wall portion 36a of the second casing member 36 and a pump cover 48 attached to the wall portion 36a of the second casing member 36, an annular inner rotor 40a having multiple outer circumferential teeth and rotatably supported around the third rotation axis C3 by a pump drive shaft 50 coupled to the second rotating shaft 22e, and an annular outer rotor 40b having multiple inner circumferential teeth meshed with the outer circumferential teeth of the inner rotor 40a and rotatably supported around a rotation axis eccentric from the third rotation axis C3 by a recess portion 36b formed in the wall portion 36a of the second casing member 36. The inner rotor 40a and the outer rotor 40b are housed in the pump chamber S3.

The mechanical oil pump 40 includes a suction-side connection port 48a formed in a sliding surface of the pump cover 48 for the inner rotor 40a and the outer rotor 40b and connected to a suction oil passage (not shown) for sucking the oil (see FIG. 4) stored in a first storage space S1a of the housing 18, a first pressure-feed-side connection port 48b formed in the sliding surface of the pump cover 48 for the inner rotor 40a and the outer rotor 40b, and a second pressure-feed-side connection port 36c formed in a sliding surface for the inner rotor 40a and the outer rotor 40b in the recess portion 36b formed in the wall portion 36a of the second casing member 36. When the inner rotor 40a and the outer rotor 40b are rotationally driven in the mechanical oil pump 40, the oil (see FIG. 4) stored in the first storage space S1a of the housing 18 is pumped up and taken into any one of multiple spaces, which are partitioned and formed by the inner circumferential teeth of the outer rotor 40b and the outer circumferential teeth of the inner rotor 40a, from the suction-side connection port 48a. The oil taken into the space is compressed by being carried to a circumferential position at which the volume of the space decreases as the inner rotor 40a rotates, and the oil having a pressure increased by the compression is discharged from the first pressure-feed-side connection port 48b and the second pressure-feed-side connection port 36c. In FIG. 4, a first oil level OL1 indicated by a dashed-dotted line is a line indicative of an oil level of the oil stored in the first storage space S1a of the housing 18 during running of the vehicle 10, and a second oil level OL2 indicated by a dashed-two dotted line is a line indicative of an oil level of the oil stored in the first storage space S1a of the housing 18 during stop of the vehicle 10.

As shown in FIGS. 1 and 2, the lubricating path 42 is provided with a first supply oil passage 52 supplying a portion of the oil discharged from the mechanical oil pump 40 to the second bearing 30a, for example, and a second supply oil passage 54 supplying another portion of the oil discharged from the mechanical oil pump 40 to the gear mechanism 22, the second bearing 30b, and the third bearing 32a, for example.

As shown in FIG. 2, the first supply oil passage 52 includes an axial oil passage 50a formed in the pump drive shaft 50, an oil providing passage 48c formed in the pump cover 48 for supplying the oil discharged from the first pressure-feed-side connection port 48b to the axial oil passage 50a of the pump drive shaft 50, and an internal space S4 of the cylindrical second rotating shaft 22e communicating with the axial oil passage 50a of the pump drive shaft 50. When the oil is discharged from the mechanical oil pump 40 to the first pressure-feed-side connection port 48b, the first supply oil passage 52 configured as described above supplies the oil discharged from the oil pump 40 to the second bearing 30a as indicated by arrows F1 shown in FIGS. 1 and 2. The arrows F1 are arrows indicative of a flow of the oil discharged by the mechanical oil pump 40 to the first pressure-feed-side connection port 48b. The pump cover 48 is provided with a relief valve 56 for discharging a portion of the oil discharged to the first pressure-feed-side connection port 48b by the mechanical oil pump 40, for example, if a discharge amount of the oil discharged to the oil providing passage 48c by the mechanical oil pump 40 becomes excessive or if the oil pressure becomes abnormally high due to clogging of an oil passage etc.

As shown in FIG. 2, the second supply oil passage 54 includes an oil providing passage 36d formed in the wall portion 36a of the second casing member 36 along the wall portion 36a and communicating with the second pressure-feed-side connection port 36c, a first branch oil passage 36e branched from the oil providing passage 36d and communicating with a space S5 around the second bearing 30b in the first housing space S1, a second branch oil passage 36f branched from the oil providing passage 36d and communicating with an internal space S6 of the cylindrical first rotating shaft 22a, and a third branch oil passage 36g branched from the oil providing passage 36d and communicating with an internal space S7 of a catch tank 58 storing a portion of the oil discharged from the mechanical oil pump 40. As shown in FIG. 2, the second supply oil passage 54 includes the internal space S6 of the first rotating shaft 22a, a radial oil passage 22f formed in the first rotating shaft 22a, the internal space S7 of the catch tank 58, and a discharge port 58a formed in the catch tank 58. The catch tank 58 is disposed in the lubricating path 42, and the catch tank 58 is arranged, for example, on the vertically upper side of the mechanical oil pump 40 in the first housing space S1 of the housing 18. The first branch oil passage 36e, the second branch oil passage 36f, and the third branch oil passage 36g are provided with respective orifices 60, 62, 36h.

In the second supply oil passage 54 configured as described above, when the oil is discharged by the mechanical oil pump 40 to the second pressure-feed-side connection port 36c, the oil discharged from the mechanical oil pump 40 is supplied to the oil providing passage 36d as indicated by an arrow F2 shown in FIGS. 1 and 2. For example, a portion of the oil supplied to the oil providing passage 36d is supplied through the first branch oil passage 36e to the second bearing 30b as indicated by an arrow F3 shown in FIGS. 1 and 2. For example, a portion of the oil supplied to the oil providing passage 36d is supplied through the second branch oil passage 36f to the internal space S6 of the first rotating shaft 22a as indicated by an arrow F4 shown in FIGS. 1 and 2, and the oil supplied to the internal space S6 of the first rotating shaft 22a is ejected to the third bearing 32a in accordance with a centrifugal force from the radial oil passage 22f formed in the first rotating shaft 22a. For example, a portion of the oil supplied to the oil providing passage 36d passes through the third branch oil passage 36g and is stored in the catch tank 58 as indicated by an arrow F5 shown in FIG. 1 and FIG. 2, and the oil stored in the catch tank 58 is ejected from the discharge port 58a formed in the catch tank 58 to the pinion 22b formed on the first rotating shaft 22a. The arrows F2 to F5 are arrows indicative of a flow of the oil discharged by the mechanical oil pump 40 to the second pressure-feed-side connection port 36c.

The electric oil pump 44 corresponds to a second oil pump of the present invention and is driven by a drive command (drive current) supplied from an electronic control device 11, for example, and controlled to rotate at a target rotation speed calculated by the electronic control device 11. In the electronic control device 11, based on a signal indicative of a temperature Ts (° C.) of the stator core 12d of the electric motor 12 supplied from a temperature sensor 13 detecting the temperature Ts, when the temperature Ts becomes higher than a predefined temperature Ts1 (° C.), the drive command (drive current) is output to the electric oil pump 44 and, for example, the electronic control device 11 performs the calculation such that the target rotation speed of the electric oil pump 44 becomes higher when the temperature Ts is higher.

As shown in FIGS. 1 and 3, the cooling path 46 includes an oil cooler 64 (see FIG. 1) cooling the oil supplied to the electric motor 12, a cooling pipe 66 having at least one first discharge hole 66a and at least one second discharge hole 66b discharging the oil for cooling the electric motor 12, i.e., the oil cooled by the oil cooler 64, a suction oil passage 68 (see FIG. 1) for sucking an oil stored in a second storage space S2a of the housing 18, i.e., for pumping up an oil stored in the second storage space S2a, a supply oil passage 70 for supplying the oil discharged from the electric oil pump 44 through the oil cooler 64 to an oil introduction port 66e of the cooling pipe 66, and a branch oil passage 72 branched from the supply oil passage 70 and guiding to an internal space (inside) S8 of the rotor shaft 26 a portion of the oil supplied to the supply oil passage 70. Although not shown, the housing 18 is provided with flowing holes allowing the oil stored in the second storage space S2a of the housing 18 and the oil stored in the first storage space S1a of the housing 18 described above (see FIG. 4) to respectively flow.

As shown in FIGS. 1 and 3, the cooling pipe 66 is formed in a tubular shape, and an end portion 66f of the tubular cooling pipe 66 on the first housing space S1 side is fixed to the partition wall 34a of the first casing member 34, while an end portion 66g of the tubular cooling pipe 66 on the side opposite to the first housing space S1 is fixed to the wall portion 38a of the third casing member 38. The cooling pipe 66 is arranged vertically above the electric motor 12 in the second housing space S2 of the housing 18, and the end portion 66g of the cooling pipe 66 is provided with the oil introduction port 66e opened at an end of the cooling pipe 66. In the cooling pipe 66 configured as described above, when the oil is introduced from the supply oil passage 70 to the oil introduction port 66e, the introduced oil is discharged from the at least one first discharge hole 66a and the at least one second discharge hole 66b formed in the cooling pipe 66 to the stator core 12d and the coil ends 12e disposed in the electric motor 12. Arrows F6 shown in FIGS. 1 and 3 are arrows indicative of a flow of the oil introduced into the oil introduction port 66e of the cooling pipe 66.

As shown in FIGS. 1 and 3, the supply oil passage 70 includes a first supply oil passage 38b formed in the wall portion 38a of the third casing member 38, and the wall portion 38a of the third casing member 38 is provided with a conduit, i.e., an orifice 38c, formed between the first supply oil passage 38b and the oil introduction port 66e of the cooling pipe 66 and having a flow-passage cross-sectional area smaller than the first supply oil passage 38b. The first supply oil passage 38b is a columnar space extended in an axial direction of the cooling pipe 66. The flow-passage cross-sectional area of the orifice 38c is, for example, an area of a cut section obtained by cutting the orifice 38c in the vertical direction (a cut section cut orthogonally to an oil flow direction), and the flow-passage cross-sectional area of the first supply oil passage 38b is, for example, an area of a cut section obtained by cutting the first supply oil passage 38b in the vertical direction (a cut section cut orthogonally to the oil flow direction).

As shown in FIG. 3, the wall portion 38a of the third casing member 38 is integrally provided with a cylindrical projecting portion 386 projecting in a cylindrical shape from the wall portion 38a into the internal space S8 of the rotor shaft 26 and a shaft-shaped shaft member 74 screwed into a female thread portion 38e formed on an internal circumferential surface of the cylindrical projecting portion 38d. As shown in FIG. 3, the branch oil passage 72 includes a first branch oil passage 38f formed to branch from the first supply oil passage 38b in the wall portion 38a of the third casing member 38 and extending in a columnar shape along the wall portion 38a, an axial oil passage 74a formed in the shaft member 74 and extending in an axial direction of the shaft member 74, i.e., in the first rotation axis C1 direction, a radial oil passage 74b communicating with the axial oil passage 74a and formed in a radial direction of the shaft member 74, and a communication oil passage 38g allowing communication between the axial oil passage 74a and the first branch oil passage 38f. The communication oil passage 38g is a space formed in the wall portion 38a of the third casing member 38 by a cover member 76 fixedly disposed on the wall portion 38a of the third casing member 38. When the oil discharged from the electric oil pump 44 is supplied to the supply oil passage 70, the branch oil passage 72 configured as described above guides into the internal space S8 of the rotor shaft 26 a portion of the oil supplied to the supply oil passage 70. Arrows F7 shown in FIGS. 1 and 3 are an arrow indicative of a flow of the oil supplied to the branch oil passage 72.

As shown in FIG. 3, the rotor 12b of the electric motor 12 is provided with a pair of disk-shaped first and second plates 12f, 12g adjacent to both ends of the rotor 12b in the first rotation axis C1 direction, and the first plate 12f is provided with a first ejection hole 12h that communicates with a first radial oil passage (radial oil passage) 26a formed in the rotor shaft 26 and that ejects the oil supplied from the first radial oil passage 26a in accordance with a centrifugal force toward the coil end 12e of the stator 12a disposed in the electric motor 12, while the second plate 12g is provided with a second ejection hole 12i that communicates with a second radial oil passage (radial oil passage) 26b formed in the rotor shaft 26 and that ejects the oil supplied from the second radial oil passage 26b in accordance with a centrifugal force toward the coil end 12e. Therefore, the first radial oil passage 26a and the second radial oil passage 26b formed in the rotor shaft 26 function as ejection holes ejecting the oil supplied to the internal space S8 of the rotor shaft 26 in accordance with the centrifugal force toward the coil ends 12e by using the first ejection hole 12h formed in the first plate 12f and the second ejection hole 12i formed in the second plate 12g. The first radial oil passage 26a and the second radial oil passage 26b formed in the rotor shaft 26 communicate with the internal space S8 of the rotor shaft 26.

In the drive device 14 configured as described above, if the temperature Ts of the stator core 12d is lower than the predefined temperature Ts1 during running of the vehicle and it is not necessary to cool the electric motor 12, the oil stored in the first storage space S1a in the housing 18 is pumped up by the mechanical oil pump 40, and the pumped-up oil is supplied through the first supply oil passage 52 and the second supply oil passage 54 to the power transmission mechanism 16, for example, the second bearings 30a, 30b, the third bearing 32a, and the pinion 22b of the first rotating shaft 22a, to lubricate the power transmission mechanism 16. If the temperature Ts of the stator core 12d is higher than the predefined temperature Ts1 during running of the vehicle 10 so that the electric motor 12 needs to be cooled, the power transmission mechanism 16 is lubricated with the lubricating path 42, and the electric oil pump 44 is driven to pump up the oil stored in the second storage space S2a of the housing 18, and the pumped-up oil is supplied to the electric motor 12 to cool the electric motor 12.

As described above, the drive device 14 of this example is provided with the lubricating path 42 including the mechanical oil pump 40 to pump up the oil stored in the housing 18 by the mechanical oil pump 40 and to supply the oil to the power transmission mechanism 16 for lubricating the power transmission mechanism 16 and the cooling path 46 that is separated from the lubricating path 42 and provided for the electric motor 12, the cooling path including the electric oil pump 44 to pump up the oil stored in the housing 18 by the electric oil pump 44 to supply the oil exclusively to the electric motor 12 for cooling the electric motor 12, and the cooling path 46 is provided with the oil cooler 64 cooling the oil to be supplied to the electric motor 12. Therefore, the drive device 14 has the cooling path 46 provided for the electric motor 12 for cooling the electric motor 12 and the lubricating path 42 for lubricating the power transmission mechanism 16 disposed as separate paths, and therefore, only when the electric motor 12 needs to be cooled, the electric oil pump 44 can be driven so that only the electric motor 12 can sufficiently be cooled with the cooling path 46 provided for the electric motor 12. Additionally, the mechanical oil pump 40 does not need to cool the electric motor 12 due to the provision of the cooling path 46 and can therefore suitably be reduced in size as compared to a conventional oil pump lubricating the power transmission mechanism 16 while cooling the electric motor 12, for example. Furthermore, since the cooling path 46 is provided with the oil cooler 64 cooling the oil supplied to the electric motor 12, a flow rate of the oil discharged from the electric oil pump 44 for cooling the electric motor 12 can be prevented from increasing, and the electric oil pump 44 can suitably be reduced in size. This makes it possible to sufficiently ensure a cooling performance for cooling the electric motor 12 and to reduce a power loss due to lubrication of the power transmission mechanism 16 and cooling of the electric motor 12 during running.

According to the drive device 14 of this example, the electric oil pump 44 is driven when the temperature Ts of the stator core 12d is higher than the predefined temperature Ts1. Therefore, the electric oil pump 44 can be driven only when the temperature Ts of the stator core 12d is higher than the predefined temperature Ts1 so that the electric motor 12 needs to be cooled.

According to the drive device 14 of this example, the lubricating path 42 is provided with the catch tank 58 storing a portion of the oil discharged from the mechanical oil pump 40 and ejecting the stored oil to the power transmission mechanism 16. Therefore, since a portion of the oil discharged from the mechanical oil pump 40 is stored in the catch tank 58, the oil level OL1 of the oil stored in the first storage space S1a of the housing 18 has a suitably lowered height, which suitably reduces an agitation loss when the differential ring gear 24c disposed in the differential device 24 of the power transmission mechanism 16 agitates the oil stored in the first storage space S1a of the housing 18.

According to the drive device 14 of this example, the cooling path 46 is provided with the cooling pipe 66 into which a portion of the oil discharged from the electric oil pump 44 is introduced and that discharges the introduced oil to the electric motor 12. Therefore, the oil stored in the second storage space S2a of the housing 18 is pumped up by the electric oil pump 44, and the pumped-up oil is discharged from the cooling pipe 66 to the electric motor 12, so that the electric motor 12 is suitably cooled with the oil.

According to the drive device 14 of this example, the rotor 12b disposed in the electric motor 12 is rotatably supported by the cylindrical rotor shaft 26 penetrating through and integrally fixed to the rotor 12b such that a portion of the oil discharged from the electric oil pump 44 is introduced into the internal space S8, and the cooling path 46 is provided with the first radial oil passage 26a and the second radial oil passage 26b formed in the rotor shaft 26 to eject the oil introduced into the internal space S8 of the rotor shaft 26 to the electric motor 12. Therefore, the oil stored in the second storage space S2a of the housing 18 is pumped up by the electric oil pump 44, and the oil introduced into the internal space S8 of the rotor shaft 26 is ejected due to a centrifugal force from the first radial oil passage 26a and the second radial oil passage 26b formed in the rotor shaft 26 to the electric motor 12, so that the electric motor 12 is suitably cooled with the oil.

According to the drive device 14 of this example, the rotor 12b disposed in the electric motor 12 is rotatably supported by the cylindrical rotor shaft 26 penetrating through and integrally fixed to the rotor 12b such that a portion of oil discharged from the electric oil pump 44 is introduced into the internal space S8, and the cooling path 46 is provided with the supply oil passage 70 for supplying the oil discharged from the electric oil pump 44 to the oil introduction port 66e of the cooling pipe 66, the branch oil passage 72 branched from the supply oil passage 70 and guiding to the internal space S8 of the rotor shaft 26 a portion of the oil supplied to the supply oil passage 70, and the first radial oil passage 26a and the second radial oil passage 26b formed in the rotor shaft 26 to eject the oil introduced into the internal space S8 of the rotor shaft 26 to the electric motor 12. Therefore, a portion of the oil supplied to the supply oil passage 70 is introduced into the internal space S8 of the rotor shaft 26 through the branch oil passage 72, and the oil introduced into the internal space S8 of the rotor shaft 26 is ejected due to a centrifugal force to the electric motor 12 from the first radial oil passage 26a and the second radial oil passage 26b disposed in the rotor shaft 26, while another portion of the oil supplied to the supply oil passage 70 is discharged from the cooling pipe 66 to the electric motor 12, so that the electric motor 12 is suitably cooled with the oil.

According to the drive device 14 of this example, the orifice 38c made smaller in flow-passage cross-sectional area than the first supply oil passage 38b of the supply oil passage 70 is formed between the first supply oil passage 38b and the oil introduction port 66e of the cooling pipe 66. Therefore, the oil supplied through the orifice 38c to the supply oil passage 70 is prevented from being excessively supplied to the cooling pipe 66, so that the oil introduced into the internal space S8 of the rotor shaft 26 is suitably prevented from becoming insufficient in flow rate.

Although the example of the present invention has been described with reference to the drawings, the present invention is also applied in other forms.

For example, although the drive device 14 is applied to the electric vehicle 10 using the electric motor 12 as the drive power source in the first example, the drive device 14 may be applied to a hybrid vehicle using an electric motor and an engine as drive power sources, for example.

Although the mechanical oil pump 40 is an internal gear type oil pump in the drive device 14 of the example, the mechanical oil pump 40 may be an external gear type oil pump or a vane type oil pump, for example, and an oil pump of any type may be used as long as the oil pump is driven by running of a vehicle so that an oil is discharged from the oil pump.

In the drive device 14 of the example, the electric oil pump 44 is driven when the temperature Ts of the stator core 12d is higher than the predefined temperature Ts1; however, for example, the electric oil pump 44 may be driven when the temperature of the coil ends 12e of the electric motor 12 is higher than a predetermined temperature.

In the drive device 14 of the example, a portion of the oil discharged from the mechanical oil pump 40 is stored in the catch tank 58; however, for example, all the oil discharged from the mechanical oil pump 40 may be stored in the catch tank 58. Although the oil stored in the catch tank 58 is ejected to the pinion 22b formed on the first rotating shaft 22a disposed in the power transmission mechanism 16, the oil stored in the catch tank 58 may be ejected to a component constituting the power transmission mechanism 16 other than the first rotating shaft 22a.

In the drive device 14 of the example, a portion of the oil discharged from the electric oil pump 44 is introduced into the cooling pipe 66 via the first supply oil passage 38b formed in the third casing member 38; however, for example, the first branch oil passage 38f may not be formed in the third casing member 38, and all the oil discharged from the electric oil pump 44 may be introduced into the cooling pipe 66. In the drive device 14 of the example, a portion of the oil discharged from the electric oil pump 44 is introduced into the internal space S8 of the rotor shaft 26 via the first branch oil passage 38f formed in the third casing member 38; however, for example, the cooling pipe 66 may not be disposed in the cooling path 46, and all the oil discharged from the electric oil pump 44 may be introduced into the internal space S8 of the rotor shaft 26.

The above description is merely an embodiment, and the present invention can be implemented in variously modified and improved forms based on the knowledge of those skilled in the art.

REFERENCE SIGNS LIST

12: electric motor (rotating electric machine)
12b: rotor

14: drive device (vehicle drive device)
16: power transmission mechanism
18: housing (casing)
26: rotor shaft
26a: first radial oil passage (radial oil passage)
26b: second radial oil passage (radial oil passage)
38c: orifice
40: mechanical oil pump (first oil pump)
42: lubricating path
44: electric oil pump (second oil pump)
46: cooling path
58: catch tank
64: oil cooler
66: cooling pipe
66e: oil introduction port
70: supply oil passage
72: branch oil passage
Ts: temperature of a stator of the electric motor
Ts1: predefined temperature
S8: internal space

What is claimed is:

1. A vehicle drive device comprising:
a rotating electric machine;
a power transmission mechanism transmitting a rotational drive power between the rotating electric machine and a plurality of wheels;
a casing housing the rotating electric machine and the power transmission mechanism, the vehicle drive device supplying an oil stored in the casing to the power transmission mechanism and the rotating electric machine to lubricate the power transmission mechanism and to cool the rotating electric machine;
a lubricating path including a first oil pump to pump an oil stored in the casing by the first oil pump and to supply the oil to the power transmission mechanism for lubricating the power transmission mechanism;
a cooling path separated from the lubricating path and provided for the rotating electric machine, the cooling path including: (i) a second electric oil pump to pump the oil stored in the casing by the second electric oil pump to supply the oil exclusively to the rotating electric machine for cooling the rotating electric machine, (ii) an oil cooler cooling the oil to be supplied to the rotating electric machine, and (iii) a cooling pipe, which is located downstream of the oil cooler and is arranged vertically above the rotating electric machine in a housing space of the casing, into which at least a portion of the oil discharged from the oil cooler and from the second electric oil pump is introduced, and the cooling pipe includes a first discharge hole and a second discharge hole that discharges the introduced oil to the rotating electric machine; and
a controller configured to control the second electric oil pump to supply oil to the rotating electric machine only when a temperature of a stator core of the rotating electric machine is greater than a predetermined temperature threshold value.

2. The vehicle drive device according to claim 1, wherein the lubricating path includes a catch tank storing at least a portion of the oil discharged from the first oil pump and ejecting the stored oil to the power transmission mechanism.

3. The vehicle drive device according to claim 1, further comprising a rotor disposed in the rotating electric machine rotatably supported by a cylindrical rotor shaft penetrating through and integrally fixed to the rotor such that at least a portion of the oil discharged from the second electric oil pump is introduced into an inside of the rotor shaft, wherein
the cooling path includes a radial oil passage formed in the rotor shaft to eject the oil introduced into the inside of the rotor shaft to the rotating electric machine.

4. The vehicle drive device according to according to claim 1, further comprising a rotor disposed in the rotating electric machine rotatably supported by a cylindrical rotor shaft penetrating through and integrally fixed to the rotor such that at least a portion of the oil discharged from the second electric oil pump is introduced into an inside of the rotor shaft, wherein
the cooling path includes (i) a supply oil passage to supply the oil discharged from the second electric oil pump to an oil introduction port of the cooling pipe, (ii) a branch oil passage branched from the supply oil passage to introduce a portion of the oil supplied to the supply oil passage to the inside of the rotor shaft, and (iii) a radial oil passage formed in the rotor shaft to eject the oil introduced into the inside of the rotor shaft to the rotating electric machine.

5. The vehicle drive device according to claim 4, further comprising an orifice located between the supply oil passage and the oil introduction port of the cooling pipe such that a cross-sectional area in flow-passage is smaller than in the supply oil passage.

* * * * *